United States Patent
Stares

(10) Patent No.: US 9,238,406 B2
(45) Date of Patent: Jan. 19, 2016

(54) VEHICLE AND METHOD OF CONTROLLING A VEHICLE

(75) Inventor: Pete Stares, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 102 days.

(21) Appl. No.: 14/000,395

(22) PCT Filed: Feb. 20, 2012

(86) PCT No.: PCT/EP2012/052854
§ 371 (c)(1),
(2), (4) Date: Oct. 25, 2013

(87) PCT Pub. No.: WO2012/110661
PCT Pub. Date: Aug. 23, 2012

(65) Prior Publication Data
US 2014/0100750 A1   Apr. 10, 2014

(30) Foreign Application Priority Data
Feb. 18, 2011 (GB) .................................. 1102826.3

(51) Int. Cl.
*B60K 23/08* (2006.01)
*B60K 17/34* (2006.01)
(Continued)

(52) U.S. Cl.
CPC ................ *B60K 23/08* (2013.01); *B60K 17/34* (2013.01); *B60K 17/35* (2013.01); *B60K 23/0808* (2013.01); *B60K 2023/0858* (2013.01); *B60W 10/02* (2013.01); *B60W 2510/0291* (2013.01)

(58) Field of Classification Search
CPC .......... B60K 23/08; B60K 2023/0841; B60K 23/0808; B60K 17/34; B60K 17/35; B60W 2510/0291
USPC ......................................................... 701/69
See application file for complete search history.

(56) References Cited

U.S. PATENT DOCUMENTS

| 4,895,217 A | 1/1990 | Hueckler et al. |
| 5,033,575 A | 7/1991 | Takeshita et al. |

(Continued)

FOREIGN PATENT DOCUMENTS

| EP | 0390197 A1 | 10/1990 |
| EP | 1270305 A2 | 1/2003 |

(Continued)

OTHER PUBLICATIONS

International Search Report for PCT/EP2012/052854 dated Jul. 18, 2012, 5 pages.

(Continued)

*Primary Examiner* — John Q Nguyen
*Assistant Examiner* — Michael Whalen
(74) *Attorney, Agent, or Firm* — Reising Ethington P.C.

(57) ABSTRACT

A motor vehicle having: prime mover means; at least first and second groups of one or more wheels; and a driveline to connect the prime mover means to the first and second groups of one or more wheels such that the first group of one or more wheels may be driven by the prime mover means when the driveline is in a first mode of operation and the second group of one or more wheels may additionally be driven by the prime mover means when the driveline is in a second mode of operation, the driveline including an auxiliary portion comprising releasable torque transmitting means operable to connect the second group of one or more wheels to a torque transmission path from the prime mover means when the driveline transitions between the first mode and the second mode, the vehicle comprising control means operable automatically to control the driveline to transition from the first mode to the second mode and from the second mode to the first mode, the control means being operable to prevent a transition from the first mode to the second mode and/or from the second mode to the first mode in dependence on a value of a prescribed vehicle operating temperature.

23 Claims, 2 Drawing Sheets

(51) Int. Cl.
*B60K 17/35* (2006.01)
*B60W 10/02* (2006.01)

(56) References Cited

U.S. PATENT DOCUMENTS

| | | | |
|---|---|---|---|
| 5,105,900 A * | 4/1992 | Adler et al. | 180/247 |
| 5,301,769 A | 4/1994 | Weiss | |
| 5,687,824 A * | 11/1997 | Hara et al. | 192/85.49 |
| 5,803,197 A | 9/1998 | Hara et al. | |
| 5,839,084 A * | 11/1998 | Takasaki et al. | 701/67 |
| 6,035,988 A * | 3/2000 | Ito et al. | 192/82 T |
| 6,568,256 B1 | 5/2003 | Lee | |
| 2003/0079954 A1 * | 5/2003 | Murakami et al. | 192/82 T |
| 2003/0109356 A1 | 6/2003 | Shigeta et al. | |
| 2003/0150685 A1 * | 8/2003 | Iida et al. | 192/82 T |
| 2005/0177294 A1 | 8/2005 | Jiang et al. | |
| 2010/0262326 A1 | 10/2010 | Buszek et al. | |

FOREIGN PATENT DOCUMENTS

| | | | |
|---|---|---|---|
| EP | 1308336 | A2 | 5/2003 |
| EP | 1527938 | A2 | 5/2005 |
| GB | 2407804 | A | 5/2005 |
| JP | S60120637 | A | 6/1985 |
| JP | S6490824 | A | 4/1989 |
| JP | 2003289694 | A | 10/2003 |
| JP | 2004359132 | A | 12/2004 |
| JP | 2005008122 | A | 1/2005 |
| WO | WO2011107222 | A1 | 9/2011 |
| WO | WO2011128567 | A1 | 10/2011 |

OTHER PUBLICATIONS

English Translation of Japanese Office Action corresponding to Japanese Patent Application No. 2013-553962, dated Oct. 3, 2014, 7 pages.

Great Britain Combined Search and Examination Report for application No. GB1102826.3, dated Jun. 10, 2011, 3 pages.

Great Britain Combined Search and Examination Report for application No. GB 1202812.2, dated Jun. 22, 2012, 7 pages.

Statement containing summary of Chinese Office action dated Aug. 27, 2015 for corresponding to CN application No. 201280019234.X, 1 page.

* cited by examiner

VEHICLE AND METHOD OF CONTROLLING A VEHICLE

FIELD OF THE INVENTION

The present invention relates to a motor vehicle and to a method of controlling a motor vehicle. In particular but not exclusively the invention relates to motor vehicles such as all-terrain vehicles (ATVs) having a driveline that is operable to change the number of wheels that provide torque to drive the vehicle.

BACKGROUND

It is known to provide a motor vehicle having a four wheel drive mode of operation in which motive power is supplied to each of two pairs of wheels of the vehicle. Motive power is supplied to the wheels by means of a driveline.

Some known vehicles are arranged such that motive power is permanently supplied to both pairs of wheels. Some other vehicles are arranged such that motive power is selectively supplied to either only one pair or to both pairs of wheels. A driver operable selector may be provided to allow the driver to select two wheel or four wheel operation. Some driveline systems require the vehicle to be stationary when transitioning between two and four wheel drive modes. Such systems may be referred to as static disconnect/reconnect systems.

GB2407804 discloses a dynamic driveline reconnect arrangement in which reconnection of two of the wheels to the driveline following disconnection of the wheels from the driveline may be undertaken when the vehicle is moving. The system disclosed in GB2407804 employs clutch arrangements to enable dynamic driveline reconnection.

In some known dynamic driveline reconnect systems the vehicle is operable automatically to connect the driveline such that both pairs of wheels are driven by the engine when a prescribed condition is met so that the vehicle operates in a four wheel drive mode. The system automatically disconnects the driveline from one of the pairs to enable two wheel drive operation when the prescribed condition is not met.

It is an aim of embodiments of the present invention to provide an improved dynamic driveline system.

STATEMENT OF THE INVENTION

Embodiments of the invention may be understood by reference to the appended claims. Aspects of the invention provide a motor vehicle and a method.

In a further aspect of the invention for which protection is sought there is provided a motor vehicle having:
prime mover means;
at least first and second groups of one or more wheels; and
a driveline to connect the prime mover means to the first and second groups of one or more wheels such that the first group of one or more wheels may be driven by the prime mover means when the driveline is in a first mode of operation and the second group of one or more wheels may additionally be driven by the prime mover means when the driveline is in a second mode of operation,
the driveline including an auxiliary portion comprising releasable torque transmitting means operable to connect the second group of one or more wheels to a torque transmission path from the prime mover means when the driveline transitions between the first mode and the second mode,
the vehicle comprising control means operable automatically to control the driveline to transition from the first mode to the second mode and from the second mode to the first mode,
the control means being operable to prevent a transition from the first mode to the second mode and/or from the second mode to the first mode in dependence on a value of a prescribed vehicle operating temperature.

It is to be understood that reference herein to a group of one or more wheels includes reference to a group having a membership of only one wheel.

It is to be understood that reference to preventing a transition between modes includes preventing one or both of a transition from the first mode to the second mode and a transition from the second mode to the first mode.

In an embodiment the control means may be arranged to prevent a transition from the second mode to the first mode when the value of the prescribed vehicle operating temperature is below a first prescribed value.

Thus in some embodiments a driveline may transition from the first mode to the second mode but not from the second mode to the first mode when the prescribed vehicle operating temperature has a value below a first prescribed value. The first prescribed value may also be referred to as a lower critical temperature value.

In an embodiment the control means may be operable to prevent a transition from the second mode to the first mode when the value of the prescribed vehicle operating temperature is above a second prescribed value.

Thus in some embodiments a driveline may transition from the first mode to the second mode but not from the second mode to the first mode when the prescribed vehicle operating temperature has a value above a second prescribed value. The second prescribed value may also be referred to as an upper critical temperature value.

In an embodiment the second prescribed temperature value may be greater than the first prescribed temperature value.

In an embodiment the control means may be operable to prevent a transition from the first mode to the second mode and from the second mode to the first mode when the value of the prescribed vehicle operating temperature is below a third prescribed value.

Thus in some embodiments the driveline is prevented from switching from the first mode to the second mode or from the second mode to the first mode when the temperature is below the third prescribed temperature. The third prescribed temperature may be referred to as a lower critical mode-lock temperature, since the driveline becomes locked in whichever mode it happens to be in when the temperature falls below the third prescribed value.

In an embodiment the first and third prescribed values of operating temperature may be substantially the same.

In an embodiment the third prescribed value may be less than the first prescribed value.

In an embodiment the control means may be operable to prevent a transition from the first mode to the second mode and from the second mode to the first mode when the value of the prescribed vehicle operating temperature is above a fourth prescribed value.

Thus in some embodiments the driveline is prevented from switching from the first mode to the second mode or from the second mode to the first mode when the temperature is above the fourth prescribed temperature. The fourth prescribed temperature may be referred to as an upper critical mode-lock temperature, since the driveline becomes locked in whichever mode it happens to be in when the temperature rises above the fourth prescribed value.

In an embodiment the second and fourth prescribed values of operating temperature may be substantially the same.

In an embodiment the fourth prescribed value may be greater than the second prescribed value.

Optionally the control means is operable automatically to control the driveline to transition from the first mode to the second mode when a first set of one or more prescribed conditions are met in respect of one or more vehicle operating parameters, the control means being further operable automatically to control the driveline to transition from the second mode to the first mode when a second set of one or more conditions are met in respect of one or more vehicle operating parameters.

In an embodiment the control means may be operable to change a first threshold value being a threshold value of a vehicle operating parameter of the first set of one or more vehicle operating parameters above or below which the driveline assumes the second mode from the first mode, in dependence on the value of the prescribed vehicle operating temperature.

Thus in some embodiments if the value of a vehicle operating parameter of the first set of one or more vehicle operating parameters rises above a threshold value the driveline assumes the second mode from the first mode. In some alternative embodiments if the value of a vehicle operating parameter of the first set of one or more vehicle operating parameters falls below a threshold value the driveline assumes the second mode from the first mode.

In an embodiment the control means may be operable to change a second threshold value being a threshold value of a vehicle operating parameter of the second set of one or more vehicle operating parameters below or above which the driveline assumes the first mode, in dependence on the value of the prescribed vehicle operating temperature.

Thus in some embodiments if the value of a vehicle operating parameter of the second set of one or more vehicle operating parameters falls below a threshold value the driveline assumes the first mode from the second mode. In some alternative embodiments if the value of a vehicle operating parameter of the second set of one or more vehicle operating parameters rises above a threshold value the driveline assumes the first mode from the second mode.

In an embodiment the first and second sets of one or more vehicle operating parameters may have a common operating parameter, the first and second threshold values being values of that operating parameter.

The first and second threshold values may be substantially equal.

In an embodiment the first and second threshold values may be different.

Thus a hysteresis gap may exist between the first and second threshold values.

In an embodiment the prescribed vehicle operating temperature may be a temperature of at least one selected from amongst a component or fluid of the vehicle, a component or fluid of the auxiliary portion of the driveline, a component or fluid of the releasable torque transmitting means and an ambient temperature.

The prescribed vehicle operating temperature may be determined by means of a sensor.

Alternatively or in addition the prescribed vehicle operating temperature may be determined by means of a virtual model implemented in computer software code, the software code having one or more inputs corresponding to one or more vehicle operating parameters other than the value of the prescribed vehicle operating temperature.

Optionally the auxiliary portion of the driveline comprises a prop shaft and the releasable torque transmitting means comprises first and second releasable torque transmitting means, the first releasable torque transmission means being operable between a connect and a disconnect condition in which the prop shaft is respectively connected to and disconnected from the torque transmission path from the prime mover means and the second releasable torque transmitting means is operable to assume a connect or a disconnect condition in which the prop shaft is respectively connected to or disconnected from the second group of one or more wheels In an embodiment in the first mode of the driveline the first and second releasable torque transmitting means may both assume the disconnect condition.

Optionally when the driveline is in the first mode and the prescribed vehicle operating temperature is below the first prescribed value the control means is arranged to place the first releasable torque transmitting means in the connect condition but to maintain the second releasable torque transmitting means in the disconnect condition or to maintain the first releasable torque transmitting means in the disconnect condition and to place the second releasable torque transmitting means in the connect condition.

This feature has the advantage that a speed difference between input and output portions of both the first and second releasable torque transmitting means may be reduced compared with a condition in which both releasable torque transmitting means are in the disconnect condition.

Optionally when the driveline is in the first mode and the prescribed vehicle operating temperature is above the second prescribed value the control means is arranged to place the first releasable torque transmitting means in the connect condition but to maintain the second releasable torque transmitting means in the disconnect condition or to maintain the first releasable torque transmitting means in the disconnect condition and to place the second releasable torque transmitting means in the connect condition.

It is to be understood that in some embodiments it is advantageous for the first and second releasable torque transmitting means to assume the disconnect condition when the driveline is in the first mode. The prop shaft is therefore isolated from the torque transmission path to the prime mover means and from the second group of one or more wheels. It may therefore become substantially stationary, reducing losses associated with prop shaft rotation.

However, in arrangements where wet clutch means is employed for the first and/or second releasable torque transmitting means, and in which the second releasable torque transmitting means accommodates differential rates of rotation of two or more wheels of the second group of wheels by slippage of clutch means (for example by employment of a drive unit, such as a rear drive unit, RDU), if a temperature of the second releasable torque transmitting means is sufficiently high it may be undesirable for slippage of clutch means to occur since this may increase the temperature of the second releasable torque transmitting means still further. Accordingly the control means may be operable to control the driveline such that the second releasable torque transmitting means remains in the disconnect condition. The first releasable torque transmitting means may be placed in the connect condition so that any difference in speed between input and output portions of the second releasable torque transmitting means is reduced. This may further reduce an amount of energy dissipated by the second releasable torque transmitting means when the driveline is in the first mode.

In other words, if the second releasable torque transmitting means comprises clutch means or the like that may be warmed if a difference in speed exists between a drive input and a drive output thereof even when in the disconnect condition in which the drive input is substantially disconnected from the drive output, by placing the first releasable torque transmitting means in the connect condition this speed difference may be reduced, potentially to substantially zero.

Optionally when the driveline is in the second mode and the prescribed vehicle operating temperature is above the third prescribed value the control means is operable to control the second releasable torque transmitting means to assume the disconnect condition whereby the driveline assumes the first mode.

This feature has the advantage that in embodiments where the second releasable torque transmitting means is connected to a drive unit that accommodates differential rates of rotation of respective left and right wheels by means of slippage of clutch means, heating of the clutch means due to slippage may be reduced. Thus if the temperature of the second releasable torque transmission means is high, this feature may reduce a risk of damage to the driveline, or reduce an amount of damage suffered by the driveline.

Optionally the control means is further arranged wherein when the driveline is in the second mode and the prescribed vehicle operating temperature is above said third prescribed value, the first releasable torque transmitting means is maintained in the connect condition when the second releasable torque transmitting means is placed in the disconnect condition.

This has the advantage that an amount of relative rotation between input and output portions of the second releasable torque transmitting means may be reduced, potentially to substantially zero. In the case described above where a drive unit is employed with wet clutch means for accommodating differential wheel rotation rates, this may reduce further heating of a portion of the driveline such as the drive unit.

It is to be understood that wet clutch means or the like may be warmed if a difference in speed exists between a drive input and a drive output thereof even when in an open condition in which the drive input is substantially disconnected from the drive output. It is to be understood that by maintaining the first releasable torque transmitting means in the connect condition, such that the drive input of the second releasable torque transmitting means is driven by the prop shaft, a speed difference between the drive input and drive output of the second releasable torque transmitting means may be reduced, potentially to substantially zero.

In an embodiment the releasable torque transmitting means may comprise clutch means, optionally wet clutch means.

In an embodiment one or both of the first and second releasable torque transmitting means may comprise clutch means.

In an embodiment the prime mover means may comprise at least one selected from amongst an internal combustion engine and an electric machine.

In one aspect of the invention for which protection is sought there is provided a method of controlling a vehicle having a driveline operable to drive first and second groups of one or more wheels comprising the steps of:
in a first mode of operation of the driveline driving the first group of one or more wheels by means of prime mover means coupled to the driveline;
in a second mode of operation of the driveline connecting an auxiliary portion of the driveline to the prime mover means by means of releasable torque transmitting means thereby to drive the second group of one or more wheels in addition to the first group,
the method comprising controlling the driveline automatically to transition between the first and second modes,
the method further comprising preventing a transition between modes from occurring in dependence on a value of a prescribed vehicle operating temperature.

In an embodiment the method may comprise the step of preventing a transition from the second mode to the first mode when the value of the prescribed vehicle operating temperature is below a first prescribed value.

In an embodiment the method may comprise the step of preventing a transition from the second mode to the first mode when the value of the prescribed vehicle operating temperature is above a second prescribed value.

Optionally the control means may be operable automatically to control the driveline to transition from the first mode to the second mode when a first set of one or more prescribed conditions are met in respect of one or more vehicle operating parameters,
the control means being further operable automatically to control the driveline to transition from the second mode to the first mode when a second set of one or more conditions are met in respect of one or more vehicle operating parameters.

In an aspect of the invention for which protection is sought there is provided a motor vehicle having: a prime mover; at least first and second groups of one or more wheels; and a driveline to connect the prime mover to the first and second groups of one or more wheels such that the first group of one or more wheels is driven by the prime mover when the driveline is in a first mode of operation and the second group of one or more wheels is additionally driven by the prime mover when the driveline is in a second mode of operation, the driveline including an auxiliary portion comprising releasable torque transmitting means operable to connect the second group of one or more wheels to the prime mover when the driveline transitions between the first mode and the second mode, wherein the vehicle is operable automatically to control the driveline to transition between the first and second modes when a first set of one or more prescribed conditions are met in respect of one or more vehicle operating parameters, the vehicle being further operable automatically to control the driveline to transition between the second and first modes when a second set of one or more conditions are met in respect of one or more vehicle operating parameters, the vehicle being operable to prevent a transition between modes from occurring in dependence on a value of a prescribed vehicle operating temperature.

In a further aspect of the invention for which protection is sought there is provided a method of controlling a vehicle having a driveline operable to drive first and second groups of one or more wheels comprising the steps of:
in a first mode of operation of the driveline driving the first group of one or more wheels by means of a prime mover couple to the driveline and not driving the second group of one or more wheels;
in a second mode of operation of the driveline connecting an auxiliary portion to the prime mover by means of releasable torque transmitting means thereby to drive the second group of one or more wheels in addition to the first group,
the method comprising controlling the driveline to transition between the first and second modes when a first set of one or more prescribed conditions are met in respect of one or more vehicle operating parameters, and controlling the driveline to transition between the second and first modes when a second set of one or more conditions are met in respect of one or more vehicle operating parameters, the method further comprising preventing a transition between modes from occurring in dependence on a value of a prescribed vehicle operating temperature.

In a still further aspect of the invention for which protection is sought there is provided a motor vehicle having:

a prime mover;

at least first and second groups of one or more wheels; and a driveline to connect the prime mover to the first and second groups of one or more wheels such that the first group of one or more wheels is driven by the prime mover when the driveline is in a first mode of operation and the second group of one or more wheels is additionally driven by the prime mover when the driveline is in a second mode of operation, the driveline including an auxiliary portion comprising releasable torque transmitting means operable to connect the second group of one or more wheels to the prime mover when the driveline transitions between the first mode and the second mode, wherein the vehicle is operable automatically to control the driveline to transition between the first and second modes responsive to the value of one or more vehicle operating parameters, the vehicle being arranged to reduce the likelihood of a transition between modes occurring responsive to the value of one or more vehicle operating parameters in dependence on the value of a vehicle operating temperature.

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
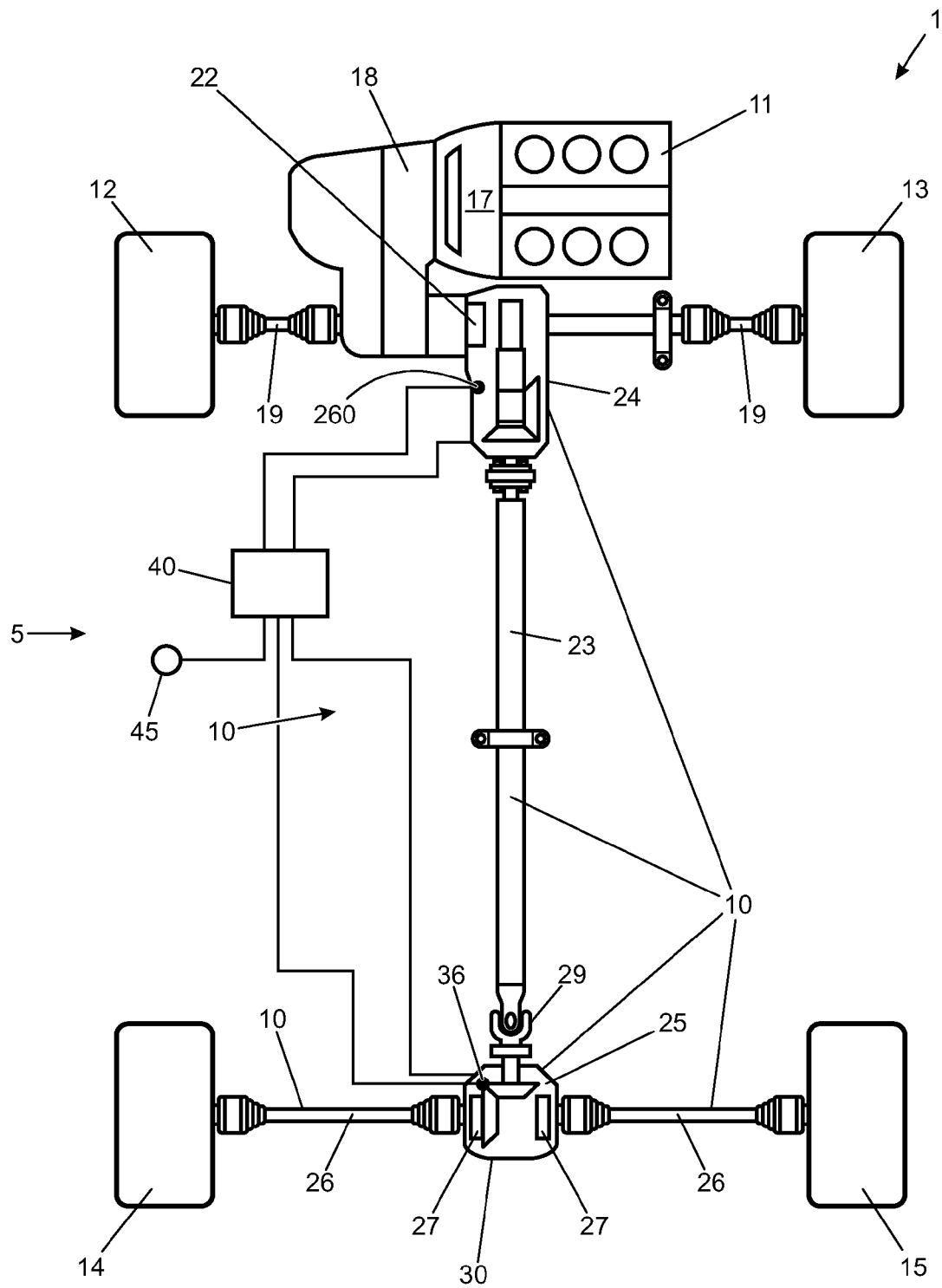
FIG. 1 is a schematic illustration of a vehicle according to an embodiment of the present invention.

FIG. 1 is a schematic illustration of a motor vehicle 1 having a driveline 5 according to an embodiment of the present invention. The driveline 5 has a gearbox 18 that is connected to a prime mover in the form of an internal combustion engine 11, a pair of front wheels 12, 13, an auxiliary portion 10 and a pair of rear wheels 14, 15.

The driveline 5 is arranged selectively to transmit power supplied to it by the internal combustion engine 11 to the front wheels 12, 13 only in a first (or two wheel drive) mode of operation or to the front wheels 12, 13 and the rear wheels 14, 15 simultaneously in a second (or four wheel drive) mode of operation.

Power is transmitted from the internal combustion engine 11 to the front wheels 12, 13 by means of a clutch 17, gearbox 18 and a pair of front drive shafts 19.

The auxiliary portion 10 of the driveline 5 has a power transfer unit (PTU) 24 having a power transfer clutch (PTC) 22 operable to connect a main drive shaft or prop shaft 23 of the auxiliary portion 10 to the gearbox 18. The prop shaft 23 is coupled in turn to a rear differential 30 operable to couple the prop shaft 23 to the rear drive shafts 26.

The rear differential 30 has a pair of clutches 27 by means of which the rear differential 30 is operable to connect the prop shaft 23 to the rear drive shafts 26 when the four wheel drive mode of operation is required.

The driveline 5 has a controller 40 arranged to control operation of the PTC 22 and clutches 27. When a four wheel drive mode of operation is required the controller 40 is arranged to close the PTC 22 and to close clutches 27 of the differential 27.

A temperature sensor 260 is provided within the PTU 24 to monitor the temperature of lubricating fluid within the PTU 24. A corresponding temperature sensor 36 is provided within the rear differential 30 to monitor the temperature of lubricating fluid within the rear differential 30. The sensors 260, 36 provide a signal to the controller 40 corresponding to the temperature of the respective components.

The vehicle is arranged to control the driveline 5 to transition from the first mode to the second mode when any one of the following conditions is met:

(a) an instantaneous amount of torque being delivered through the driveline to one or more wheels is above a first prescribed instantaneous torque threshold, (b) a steering wheel angle is above a first prescribed steering wheel angle threshold, (c) a steerable road wheel angle is greater than a first prescribed steerable road wheel angle threshold, (d) a rate of change of steerable road wheel angle exceeds a first prescribed steerable road wheel angle rate threshold, (e) a rate of change of steering wheel angle exceeds a first prescribed steering wheel angle rate threshold, (f) a lateral acceleration of the vehicle is greater than a first prescribed lateral acceleration threshold, (g) a rate of change of lateral acceleration exceeds a first prescribed lateral acceleration rate threshold, (h) a throttle or accelerator pedal position value is greater than a first prescribed throttle or accelerator pedal position threshold, (i) a rate of change of throttle or accelerator pedal position is greater than a first prescribed throttle or accelerator pedal position rate threshold, (j) a driver demanded torque is greater than a first prescribed driver demanded torque threshold, (k) a prime mover torque is greater than a first prescribed prime mover torque threshold, (l) an amount of wheel slip is above a first prescribed wheel slip threshold, (m) a vehicle acceleration is greater than a first prescribed vehicle acceleration threshold, (n) a vehicle deceleration is greater than a first prescribed vehicle deceleration threshold, (o) a yaw rate of the vehicle is greater than a first prescribed yaw rate threshold, (p) a yaw rate error is greater than a first prescribed yaw rate error threshold, (q) a speed of the vehicle is below a first prescribed vehicle speed threshold, (r) an operating temperature is below a first prescribed operating temperature threshold, (s) an ambient temperature is below a first prescribed ambient temperature threshold,
(t) a temperature of a vehicle component is below a first prescribed component temperature threshold,
(u) a temperature of a vehicle fluid is below a first prescribed fluid temperature threshold,
(v) a temperature of a component of the auxiliary driveline is below a first prescribed driveline component lower temperature threshold,
(w) a temperature of a fluid of the auxiliary driveline is below a first prescribed driveline fluid lower temperature threshold,
(x) a temperature of a component of the auxiliary driveline is above a first prescribed driveline component upper temperature threshold greater than the first prescribed driveline component lower temperature threshold,
(y) a temperature of a fluid of the auxiliary driveline is above a first prescribed driveline fluid upper temperature threshold greater than the first prescribed driveline fluid lower temperature threshold,
(z) a roughness of a driving surface is above a first prescribed surface roughness threshold,
(a1) a brake pedal position value is greater than a first prescribed brake pedal position threshold, and
(b1) a brake pressure value is greater than a first prescribed brake pressure threshold.

The vehicle is further configured to transition from the second mode back to the first mode when no condition triggering a transition from the first mode to the second mode is met.

It is to be understood that in some embodiments not all of conditions (a) to (b1) listed above will trigger a transition to the second mode. One or more alternative conditions, in addition or instead, may be arranged to trigger the transition.

In some embodiments, a further condition must be met in order for the transition back to the first mode to be allowed in addition to the requirement that no condition triggering the transition to the second mode is met. Thus, for each of the one or more conditions (a) to (b1) that triggered the condition to the second mode, the corresponding one or more conditions for a return to the first mode may be that:
(a) an instantaneous amount of torque being delivered through the driveline to one or more wheels is less than a second prescribed instantaneous torque threshold less than the first threshold,
(b) a steering wheel angle is below a second prescribed steering wheel angle threshold less than the first threshold,
(c) a steerable road wheel angle is less than a second prescribed steerable road wheel angle threshold less than the first threshold,
(d) a rate of change of steerable road wheel angle is less than a second prescribed steerable road wheel angle rate threshold less than the first threshold,
(e) a rate of change of steering wheel angle is less than a second prescribed steering wheel angle rate threshold less than the first threshold,
(f) a lateral acceleration of the vehicle is less than a second prescribed lateral acceleration threshold less than the first threshold,
(g) a rate of change of lateral acceleration is less than a second prescribed lateral acceleration rate threshold less than the first threshold,
(h) a throttle or accelerator pedal position value is less than a second prescribed throttle or accelerator pedal position threshold less than the first threshold,
(i) a rate of change of throttle or accelerator pedal position is less than a second prescribed throttle or accelerator pedal position rate threshold less than the first threshold,
(j) a driver demanded torque is less than a second prescribed driver demanded torque threshold less than the first threshold,
(k) a prime mover torque is less than a second prescribed prime mover torque threshold less than the first threshold,
(l) an amount of wheel slip is less than a second prescribed wheel slip threshold less than the first threshold,
(m) a vehicle acceleration is less than a second prescribed vehicle acceleration threshold less than the first threshold,
(n) a vehicle deceleration is less than a second prescribed vehicle deceleration threshold less than the first threshold,
(o) a yaw rate of the vehicle is less than a second prescribed yaw rate threshold less than the first threshold,
(p) a yaw rate error is less than a second prescribed yaw rate error threshold less than the first threshold,
(q) a speed of the vehicle is above a second prescribed vehicle speed threshold greater than the first threshold,
(r) an operating temperature is above a second prescribed operating temperature threshold greater than the first threshold,
(s) an ambient temperature is above a second prescribed ambient temperature threshold greater than the first threshold,
(t) a temperature of a vehicle component is above a second prescribed component temperature threshold greater than the first threshold,
(u) a temperature of a vehicle fluid is above a second prescribed fluid temperature threshold greater than the first threshold,
(v) a temperature of a component of the auxiliary driveline is above a second prescribed driveline component lower temperature threshold greater than the first threshold,
(w) a temperature of a fluid of the auxiliary driveline is above a second prescribed driveline fluid lower temperature threshold greater than the first threshold,
(x) a temperature of a component of the auxiliary driveline is below a second prescribed driveline component upper temperature threshold less than the first threshold,
(y) a temperature of a fluid of the auxiliary driveline is below a second prescribed driveline fluid upper temperature threshold less than the first threshold, and
(z) a roughness of a driving surface is below a second prescribed surface roughness threshold less than the first threshold,
(a1) a brake pedal position value is less than a second prescribed brake pedal position threshold less than the first threshold, and
(b1) a brake pressure value is less than a second prescribed brake pressure threshold less than the first threshold.

Thus, if (say) conditions (a) and (b) for the transition to the second mode are met when the vehicle is in the first mode of operation, the vehicle will transition to the second mode.

Subsequently, when both conditions (a) and (b) for the transition from the second mode to the first mode are met, the vehicle will transition back to the first mode provided none of the remaining conditions (c) to (b1) for the transition from the first mode to the second mode are met.

It is to be understood that under certain vehicle operating conditions a temperature of one or more components of the driveline 5 including the auxiliary portion 10 may rise to a temperature at which it is undesirable for switching between the first and second modes to take place. For example, if the vehicle 1 has been driven harshly and multiple transitions have taken place between the first and second modes the temperature of the PTU 24 and/or rear differential 30 may rise.

Accordingly, the vehicle 1 is arranged to monitor the temperatures measured by the PTU temperature sensor 260 and rear differential temperature sensor 36.

If the temperature measured by the PTU sensor 260 or rear differential sensor 36 exceeds a prescribed upper critical temperature value the vehicle 1 is configured to latch the driveline 5 in the state in which it is currently in. If the driveline 5 is in the second mode the driveline 5 remains latched in the second mode until the temperature measured by the both sensors 260, 36 falls below the prescribed upper critical temperature, whereupon a transition to the first mode is permitted if so required.

If the driveline 5 is in the first mode, the vehicle 1 may be configured to allow a transition to the second mode should one of the conditions (a) to (b1) for the transition to the second mode be met. However once in the second mode, a transition back to the first mode is not permitted unless the temperature measured by both sensors 260, 36 has fallen below the prescribed upper critical temperature value as above.

In some embodiments the prescribed upper critical temperature value may be around 150° C. Other temperatures are also useful.

Embodiments of the invention having this feature have the advantage that if the second mode is required in order to reduce slip, the vehicle is allowed to transition to the second mode even though one or both temperatures measured by the temperature sensors 260, 36 are above the upper critical temperature value. However, once in the second mode the driveline 5 is prevented from transitioning back to the first mode whilst the temperature measured by either sensor exceeds the upper critical temperature. It is to be understood that by preventing transitions from the second to the first modes under these conditions, a probability that a transition from the second mode to the first mode when one or both of the temperatures are above the prescribed upper critical temperature value is reduced substantially to zero.

In some embodiments the upper critical temperature value above which a transition from the second mode to the first mode is not permitted may be different for the PTU 24 and the rear differential 30.

In some embodiments, in addition or alternatively the value of one or more of the first prescribed threshold values for which a transition to the second mode may be triggered are arranged to be changed in order to reduce the likelihood of a transition from the first mode to the second mode. It is to be understood that changing a threshold to reduce a likelihood of a transition has the effect that under certain conditions a transition between modes which would otherwise have been allowed if the threshold had not been changed is prevented from taking place.

In some embodiments in which first and second prescribed thresholds are employed for one or more parameters, the value of one or more of the second prescribed thresholds may be changed in addition or instead, thereby reducing a likelihood of a transition from the second mode to the first mode when in the second mode.

In some embodiments the vehicle 1 is arranged to respond in a corresponding manner to that described above in respect of high PTU or differential sensor temperatures if the PTU sensor temperature or differential sensor temperature fall below a prescribed lower critical temperature value. The prescribed lower critical temperature value may for example be around −10° C.

Thus, if the temperature of the PTU 24 or differential 30 fall below the prescribed lower critical temperature values (which may have the same value in some embodiments) and the driveline 5 is in the second mode, the driveline is configured to remain in the second mode until both temperatures rise above their respective prescribed lower critical temperature values.

In contrast, if the driveline 5 is in the first mode, a transition to the second mode may be permitted. However once in the second mode, a transition back to the first mode is inhibited until both temperatures rise above their respective prescribed lower critical temperature values.

Other arrangements are also useful. For example, the lower critical temperature value of the PTU 24 may be different from that of the differential 30.

It is to be understood that embodiments of the invention have the advantage that an amount of activity of the driveline 5 in transitioning to and fro between the first and second modes may be reduced and in some embodiments substantially prevented responsive to the temperature of one or more portions (including one or more fluids) of the driveline 5.

In some embodiments, if the temperature of the PTU 24 or rear differential 30 falls below a lower critical mode-lock temperature, no driveline mode transitions are permitted to take place, whether from the first mode to the second mode or from the second mode to the first mode. That is, the driveline becomes locked or latched in its current mode. It is to be understood that the lower critical mode-lock temperature may be selected to be a temperature below which one or both of the PTU 24 and rear differential 30 is incapable of connecting or disconnecting the prop shaft from the engine 11 and rear wheels 14, 15 respectively.

In some embodiments the prescribed lower critical temperature value may be around −30° C. and the prescribed lower critical mode-lock temperature value may be around −40° C.

In some embodiments, if the temperature of the PTU 24 or rear differential 30 rises above an upper critical mode-lock temperature, no driveline mode transitions are permitted to take place, whether from the first mode to the second mode or from the second mode to the first mode. It is to be understood that the upper critical mode-lock temperature may be selected to be a temperature above which one or both of the PTU 24 and rear differential 30 is incapable of connecting or disconnecting the prop shaft from the engine 11 and rear wheels 14, 15 respectively.

In some embodiments, instead of a rear differential 30, a rear drive unit (RDU) may be provided for driving left and right-hand rear wheels in which a speed differential between the left and right rear wheels is accommodated by slippage across one or more clutches of the RDU.

Figure 2:
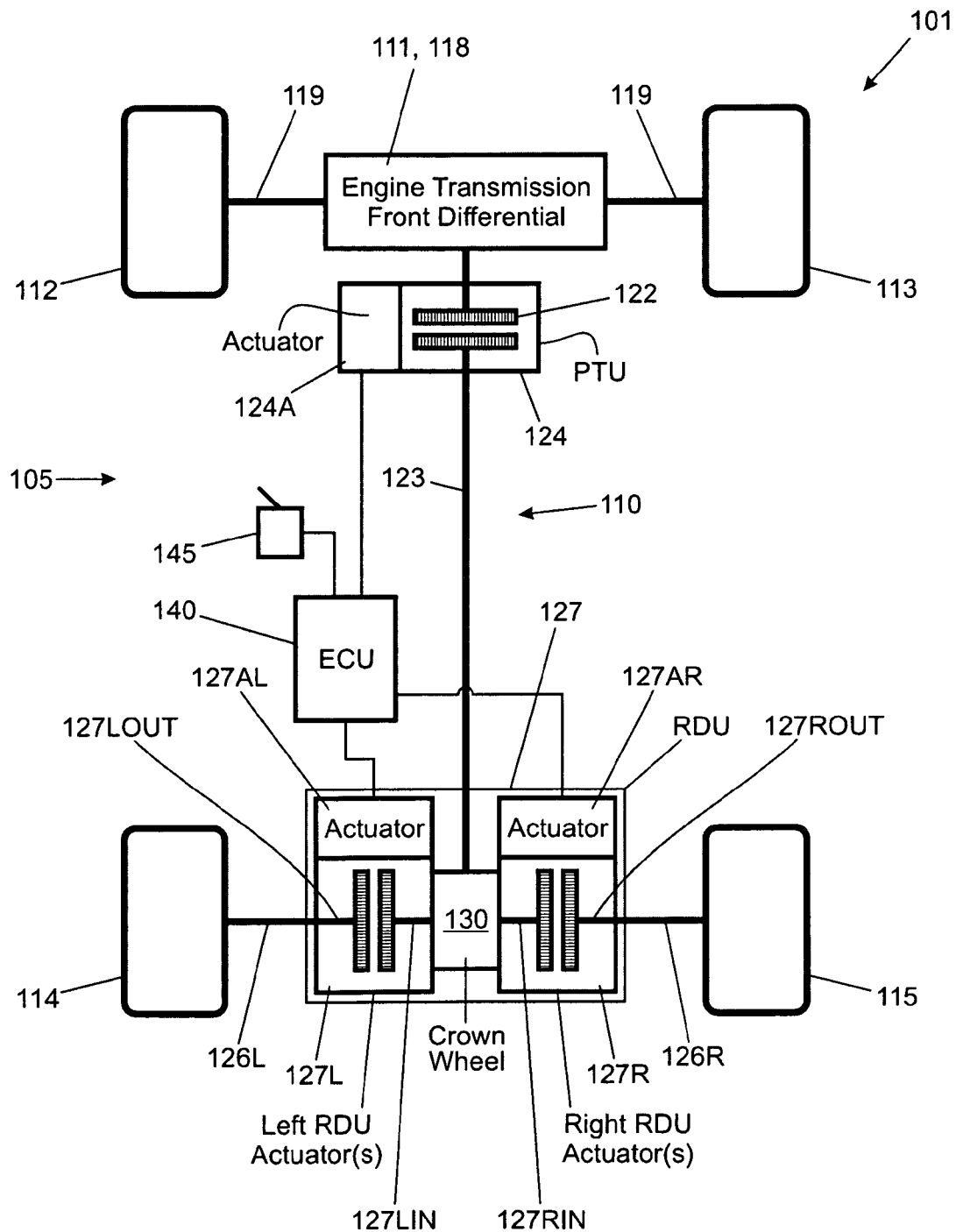
FIG. 2 is a schematic diagram of a controller of a motor vehicle according to a further embodiment of the present invention.

FIG. 2 shows a vehicle 100 according to such an embodiment of the invention. Like features of the embodiment of FIG. 2 to those of the embodiment of FIG. 1 are provided with like reference numerals incremented by 100.

The embodiment of FIG. 2 is similar to that of FIG. 1 in that the driveline 105 has a power transfer unit (PTU) 124 operable to connect one end of an auxiliary drive shaft or prop shaft 123 of an auxiliary portion 110 of the driveline 105 to the engine 111 via a transmission 118 of the driveline 105 by closing a power transfer clutch (PTC) 122 of the PTU 124.

However, instead of a rear differential 30, the auxiliary portion 110 has a rear drive unit (RDU) 127. In the embodiment of FIG. 2 the RDU 127 has a crown wheel 130 coupled to an end of the prop shaft 123 opposite the end of the prop shaft 123 that is connected to the PTU 124.

The RDU 127 also has left and right friction clutches 127L, 127R operable to couple the crown wheel 130 to left and right rear drive shafts 126L, 126R, respectively which are in turn coupled to respective left and right rear wheels 114, 115.

The RDU 127 is provided with left and right actuators 127AL, 127AR respectively operable to open and close the left and right friction clutches 127L, 127R. The actuators 127AL, 127AR are arranged such that as the actuators 127AL, 127AR move from a first position in which both friction clutches 127L, 127R are open towards a second position in which both friction clutches 127L, 127R are closed, pressure is applied to the respective friction clutches 127L, 127R thereby to close the friction clutches 127L, 127R.

If one of the rear wheels 114, 115 is required to rotate at a faster rate than the other, for example due to cornering, slip of one or both of the clutches 127L, 127R is permitted thereby to allow the differential rotation rates.

It is to be understood that under certain circumstances a prescribed operating temperature of the vehicle, for example a temperature of a component of the auxiliary driveline 110 such as a temperature of the RDU 127 and/or of the clutches 127L, 127R may reach or exceed a prescribed maximum operating temperature. This may be due for example to slipping of one or both of the RDU clutches 127L, 127R.

Under these circumstances the vehicle 100 may be arranged to open the clutches 127L, 127R thereby causing the vehicle 100 to transition to the first mode of operation and to prevent closure of the clutches 127L, 127R (thereby preventing a transition from the first mode to the second mode) until the prescribed operating temperature falls to an acceptable level.

In some embodiments, the vehicle may be further arranged to maintain the PTC 122 in the closed condition thereby to reduce a difference in rotation rate between input shafts 127LIN, 127RIN and output shafts 127LOUT, 127ROUT of the clutches 127L, 127R.

In some embodiments, instead of directly measuring the temperature of a component such as the PTU 24, 124, differential 30 or RDU 127, a thermal model of component temperature may be employed to predict the likely temperature. The thermal model may have as an input clutch activity, driveline torque and/or one or more other parameters that would enable an estimate of temperature of a PTU, differential or RDU to be made. An advantage of such a system is that a risk of failure of the vehicle or of damage occurring to a component (for example due to overheating) as a consequence of malfunction of a temperature sensor may be reduced.

Alternatively or in addition, a temperature of a PTU, a differential or an RDU may be determined indirectly based on information from one or more temperature sensors arranged to measure a temperature of a different component or fluid.

For example, the temperature of a clutch of the PTU, differential or RDU may be made based on a temperature of a component such as a gearbox, a driveline actuator such as a clutch actuator or any other suitable component.

Other arrangements are also useful.

Embodiments of the invention have the advantage that a risk of damage to one or more components of the auxiliary portion of a driveline of a vehicle may be reduced by preventing a transition between modes responsive to a value (measured or predicted) of a prescribed vehicle operating temperature. Some embodiments of the invention have the effect that a PTU, differential and/or RDU may be prevented from operating at temperatures exceeding prescribed values. Furthermore, a risk that a temperature of one of these components exceeds a prescribed value for a prolonged period may also be reduced.

Reference to a vehicle operating temperature may be understood to mean reference to a temperature of a component or fluid of a vehicle in some embodiments.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

This application claims priority from UK patent application no. GB1102826.3 filed 18 Feb. 2011, the entire contents of which are expressly incorporated by reference herein.

The invention claimed is:

1. A motor vehicle having:
   a prime mover;
   at least first and second groups of one or more wheels; and
   a driveline to connect the prime mover to the first and second groups of one or more wheels such that the first group of one or more wheels may be driven by the prime mover when the driveline is in a first mode of operation and the second group of one or more wheels may additionally be driven by the prime mover when the driveline is in a second mode of operation,
   the driveline including an auxiliary portion comprising releasable torque transmitting means operable to connect the second group of one or more wheels to a torque transmission path from the prime mover when the driveline transitions between the first mode and the second mode,
   the vehicle comprising control means operable automatically to control the driveline to transition from the first mode to the second mode and from the second mode to the first mode,
   the control means being operable to prevent a transition from the first mode to the second mode and from the second mode to the first mode in dependence on a value of a prescribed vehicle operating temperature, wherein the control means is arranged to prevent a transition from the second mode to the first mode when the value of the prescribed vehicle operating temperature is below a first prescribed value, and the control means is operable to prevent a transition from the first mode to the second mode and from the second mode to the first mode when the value of the prescribed vehicle operating temperature is below a third prescribed value, the third prescribed value being lower than the first prescribed value.

2. The vehicle claimed in claim 1 wherein the control means is operable automatically to control the driveline to transition from the first mode to the second mode when a first set of one or more prescribed conditions are met in respect of one or more vehicle operating parameters,
   the control means being further operable automatically to control the driveline to transition from the second mode to the first mode when a second set of one or more conditions are met in respect of one or more vehicle operating parameters.

3. The vehicle claimed in claim 2 wherein the control means is operable to change a first threshold value being a threshold value of a vehicle operating parameter of the first set of one or more vehicle operating parameters above or below which the driveline assumes the second mode from the first mode, in dependence on the value of the prescribed vehicle operating temperature.

4. The vehicle claimed in claim 3 wherein the control means is operable to change a second threshold value being a threshold value of a vehicle operating parameter of the second set of one or more vehicle operating parameters below or above which the driveline assumes the first mode, in dependence on the value of the prescribed vehicle operating temperature.

5. The vehicle claimed in claim 4 wherein the first and second sets of one or more vehicle operating parameters have a common operating parameter, the first and second threshold values being values of that operating parameter.

6. The vehicle claimed in claim 5 wherein the first and second threshold values are substantially equal.

7. The vehicle claimed in claim 5 wherein the first and second threshold values are different.

8. The vehicle claimed in claim 1 wherein the prescribed vehicle operating temperature is a temperature of at least one selected from amongst a component or fluid of the vehicle, a component or fluid of the auxiliary portion of the driveline, a component or fluid of the releasable torque transmitting means and an ambient temperature.

9. The vehicle claimed in claim 1 wherein the prescribed vehicle operating temperature is determined by means of a virtual model implemented in computer software code, the software code having one or more inputs corresponding to one or more vehicle operating parameters other than the value of the prescribed vehicle operating temperature.

10. The vehicle claimed in claim 1 wherein the auxiliary portion of the driveline comprises a prop shaft and the releasable torque transmitting means comprises first and second releasable torque transmitting means, the first releasable torque transmission means being operable between a connect and a disconnect condition in which the prop shaft is respectively connected to and disconnected from the torque transmission path from the prime mover and the second releasable torque transmitting means is operable to assume a connect or a disconnect condition in which the prop shaft is respectively connected to or disconnected from the second group of one or more wheels.

11. The vehicle claimed in claim 10 operable wherein in the first mode of the driveline the first and second releasable torque transmitting means both assume the disconnect condition.

12. The vehicle claimed in claim 10 wherein the control means is arranged to prevent a transition from the second mode to the first mode when the value of the prescribed vehicle operating temperature is below a first prescribed value and wherein when the driveline is in the first mode and the prescribed vehicle operating temperature is below the first prescribed value the control means is arranged to place the first releasable torque transmitting means in the connect condition but to maintain the second releasable torque transmitting means in the disconnect condition or to maintain the first releasable torque transmitting means in the disconnect condition and to place the second releasable torque transmitting means in the connect condition.

13. The vehicle claimed in claim 10 wherein the control means is arranged to prevent a transition from the second mode to the first mode when the value of the prescribed vehicle operating temperature is below a first prescribed value, wherein the control means is operable to prevent a transition from the second mode to the first mode when the value of the prescribed vehicle operating temperature is above a second prescribed value, and wherein when the driveline is in the first mode and the prescribed vehicle operating temperature is above the second prescribed value the vehicle is arranged to place the first releasable torque transmitting means in the connect condition but to maintain the second releasable torque transmitting means in the disconnect condition or to maintain the first releasable torque transmitting means in the disconnect condition and to place the second releasable torque transmitting means in the connect condition.

14. The vehicle claimed in claim 10 wherein when the driveline is in the second mode and the prescribed vehicle operating temperature is above the third prescribed value the control means is operable to control the second releasable torque transmitting means to assume the disconnect condition whereby the driveline assumes the first mode.

15. The vehicle claimed in claim 14 further arranged wherein when the driveline is in the second mode and the prescribed vehicle operating temperature is above said third prescribed value, the first releasable torque transmitting means is maintained in the connect condition when the second releasable torque transmitting means is placed in the disconnect condition.

16. The vehicle claimed in claim 10 wherein one or both of the first and second releasable torque transmitting means comprises clutch means.

17. The vehicle claimed in claim 1 wherein the releasable torque transmitting means comprises clutch means.

18. The vehicle as claimed in claim 1 wherein the prime mover comprises at least one selected from amongst an internal combustion engine and an electric machine.

19. A method of controlling a vehicle having a driveline operable to drive first and second groups of one or more wheels comprising the steps of:
    in a first mode of operation of the driveline driving the first group of one or more wheels by means of a prime mover coupled to the driveline;
    in a second mode of operation of the driveline connecting an auxiliary portion of the driveline to the prime mover by means of releasable torque transmitting means thereby to drive the second group of one or more wheels in addition to the first group,
    the method comprising controlling the driveline automatically to transition between the first and second modes,
    the method further comprising preventing a transition between modes from occurring in dependence on a value of a prescribed vehicle operating temperature, the method further comprising preventing a transition from the second mode to the first mode when the value of the prescribed vehicle operating temperature is below a first prescribed value and preventing a transition from the first mode to the second mode and from the second mode to the first mode when the value of the prescribed vehicle operating temperature is below a third prescribed value, the third prescribed value being lower than the first prescribed value.

20. The method claimed in claim 19 comprising the step of preventing a transition from the second mode to the first mode when the value of the prescribed vehicle operating temperature is above a second prescribed value.

21. The method claimed in claim 19, wherein the control means is operable automatically to control the driveline to transition from the first mode to the second mode when a first set of one or more prescribed conditions are met in respect of one or more vehicle operating parameters, the control means being further operable automatically to control the driveline to transition from the second mode to the first mode when a second set of one or more conditions are met in respect of one or more vehicle operating parameters.

22. A motor vehicle having:

a prime mover;

at least first and second groups of one or more wheels; and a driveline to connect the prime mover to the first and second groups of one or more wheels such that the first group of one or more wheels may be driven by the prime mover when the driveline is in a first mode of operation and the second group of one or more wheels may additionally be driven by the prime mover when the driveline is in a second mode of operation, the driveline including an auxiliary portion comprising releasable torque transmitting means operable to connect the second group of one or more wheels to a torque transmission path from the prime mover when the driveline transitions between the first mode and the second mode, the vehicle comprising control means operable automatically to control the driveline to transition from the first mode to the second mode and from the second mode to the first mode, the control means being operable to prevent a transition from the first mode to the second mode and from the second mode to the first mode in dependence on a value of a prescribed vehicle operating temperature, wherein the control means is operable to prevent a transition from the second mode to the first mode when the value of the prescribed vehicle operating temperature is above a second prescribed value and the control means is operable to prevent a transition from the first mode to the second mode and from the second mode to the first mode when the value of the prescribed vehicle operating temperature is above a fourth prescribed value, the fourth prescribed value being greater than the second prescribed value.

23. A method of controlling a vehicle having a driveline operable to drive first and second groups of one or more wheels comprising the steps of:

in a first mode of operation of the driveline driving the first group of one or more wheels by means of a prime mover coupled to the driveline;

in a second mode of operation of the driveline connecting an auxiliary portion of the driveline to the prime mover by means of releasable torque transmitting means thereby to drive the second group of one or more wheels in addition to the first group, the method comprising controlling the driveline automatically to transition between the first and second modes, the method further comprising preventing a transition from the second mode to the first mode when the value of the prescribed vehicle operating temperature is above a second prescribed value and preventing a transition from the first mode to the second mode and from the second mode to the first mode when the value of the prescribed vehicle operating temperature is above a fourth prescribed value, the fourth prescribed value being greater than the second prescribed value.

* * * * *